US008881213B2

United States Patent
Schmidt et al.

(10) Patent No.: US 8,881,213 B2
(45) Date of Patent: Nov. 4, 2014

(54) ALIGNMENT OF VIDEO FRAMES

(71) Applicant: Verizon Patent and Licensing Inc., Basking Ridge, NJ (US)

(72) Inventors: Johannes P. Schmidt, Los Altos Hills, CA (US); Leslie Harris Francis, Saratoga, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 56 days.

(21) Appl. No.: 13/802,336

(22) Filed: Mar. 13, 2013

(65) Prior Publication Data

US 2014/0267779 A1   Sep. 18, 2014

(51) Int. Cl.
*H04N 7/18* (2006.01)
*H04N 17/00* (2006.01)

(52) U.S. Cl.
CPC .................................. *H04N 17/00* (2013.01)
USPC .......................................... 725/102; 725/100

(58) Field of Classification Search
None
See application file for complete search history.

(56) References Cited

U.S. PATENT DOCUMENTS

| | | | | |
|---|---|---|---|---|
| 6,154,496 | A * | 11/2000 | Radha | 375/240.28 |
| 7,706,447 | B2 * | 4/2010 | Karczewicz et al. | 375/240.2 |
| 8,184,687 | B1 * | 5/2012 | Strasman et al. | 375/240.01 |
| 8,369,399 | B2 * | 2/2013 | Egnal et al. | 375/240.08 |
| 8,605,783 | B2 * | 12/2013 | El-Saban et al. | 375/240.1 |
| 2003/0021346 | A1 * | 1/2003 | Bixby et al. | 375/240.25 |
| 2003/0185541 | A1 * | 10/2003 | Green | 386/46 |
| 2003/0206596 | A1 * | 11/2003 | Carver et al. | 375/240.26 |
| 2007/0162611 | A1 * | 7/2007 | Yu et al. | 709/232 |
| 2010/0104184 | A1 * | 4/2010 | Bronstein et al. | 382/170 |
| 2010/0296571 | A1 * | 11/2010 | El-Saban et al. | 375/240.01 |
| 2012/0331106 | A1 * | 12/2012 | Ramamurthy et al. | 709/218 |
| 2014/0079278 | A1 * | 3/2014 | Shah | 382/100 |

* cited by examiner

*Primary Examiner* — Fernando Alcon (57) ABSTRACT

In embodiments, apparatuses, methods and storage media are described that are associated with determination of frame alignment. In embodiments, a similarity value matrix may be determined representing similarity values for pairs of frames from two pieces of video content. An alignment score matrix may be determined from the similarity scores. Multiple sets of frames may be selected from the two pieces of video content and alignment score matrices determined for each set. From these alignment score matrices, an alignment of frames may be determined. In embodiments, a Needleman-Wunsch process may be used to compute alignment scores as well as to compute alignments based on alignment score matrices. Other embodiments may be described and claimed.

21 Claims, 7 Drawing Sheets

ALIGNMENT OF VIDEO FRAMES

TECHNICAL FIELD

The present disclosure relates to the field of data processing, in particular, to apparatuses, methods and systems associated with alignment of frames of video content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of content, and the manners in which the content is consumed. Today, myriad content may be made available from various sources of content, including but not limited to fixed medium (e.g., Digital Versatile Disk (DVD)), broadcast, cable operators, satellite channels, Internet, and so forth. Users may consume content with a television set, a laptop or desktop computer, a tablet, a smartphone, or other devices of the like.

Video may be viewed in a variety of formats and/or with different video settings. Because of this, different pieces of video content may be made from an original source. However, these different pieces of video content may exhibit differences in video quality and/or may exhibit errors or dropped frames.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
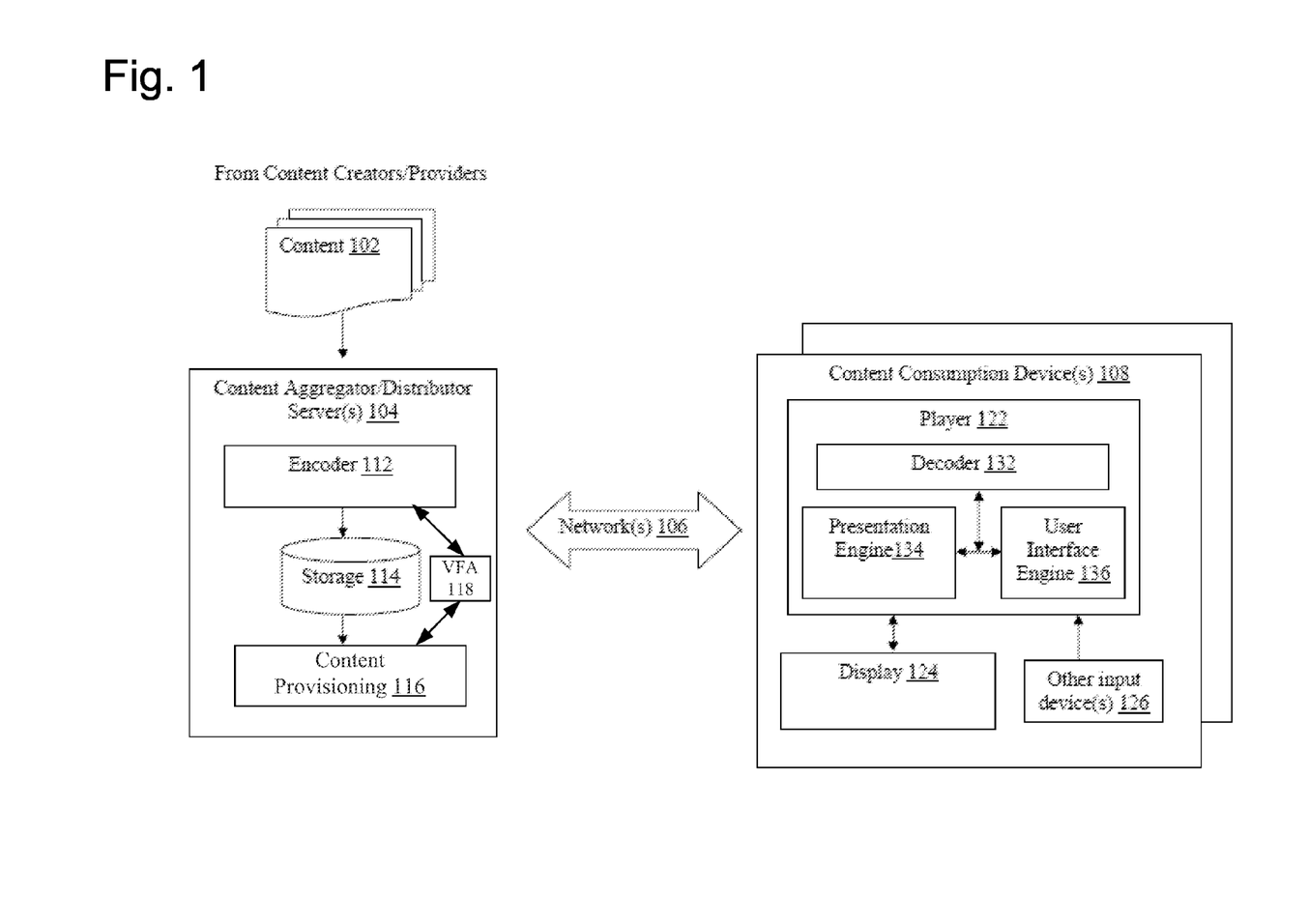
FIG. 1 illustrates an example arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats. In various embodiments, the content aggregator/distributor server(s) 104 may further include a video frame alignment system 118 ("VFA 118"), which may be coupled to various components of the content aggregator/distributor server(s) 104, including, for example, encoder 112 and/or content provisioning 116. In various embodiments, the VFA 118 may be configured to receive pieces of video content and to output an alignment of video frames so as to provide for comparisons of video content during encoding and/or provisioning. The usage and potential benefit from having the alignment information will be further described below. Particular embodiments of the VFA 118 may be described below.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and user input device 126 may be a separate remote control (such as described below), gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

Figure 2:
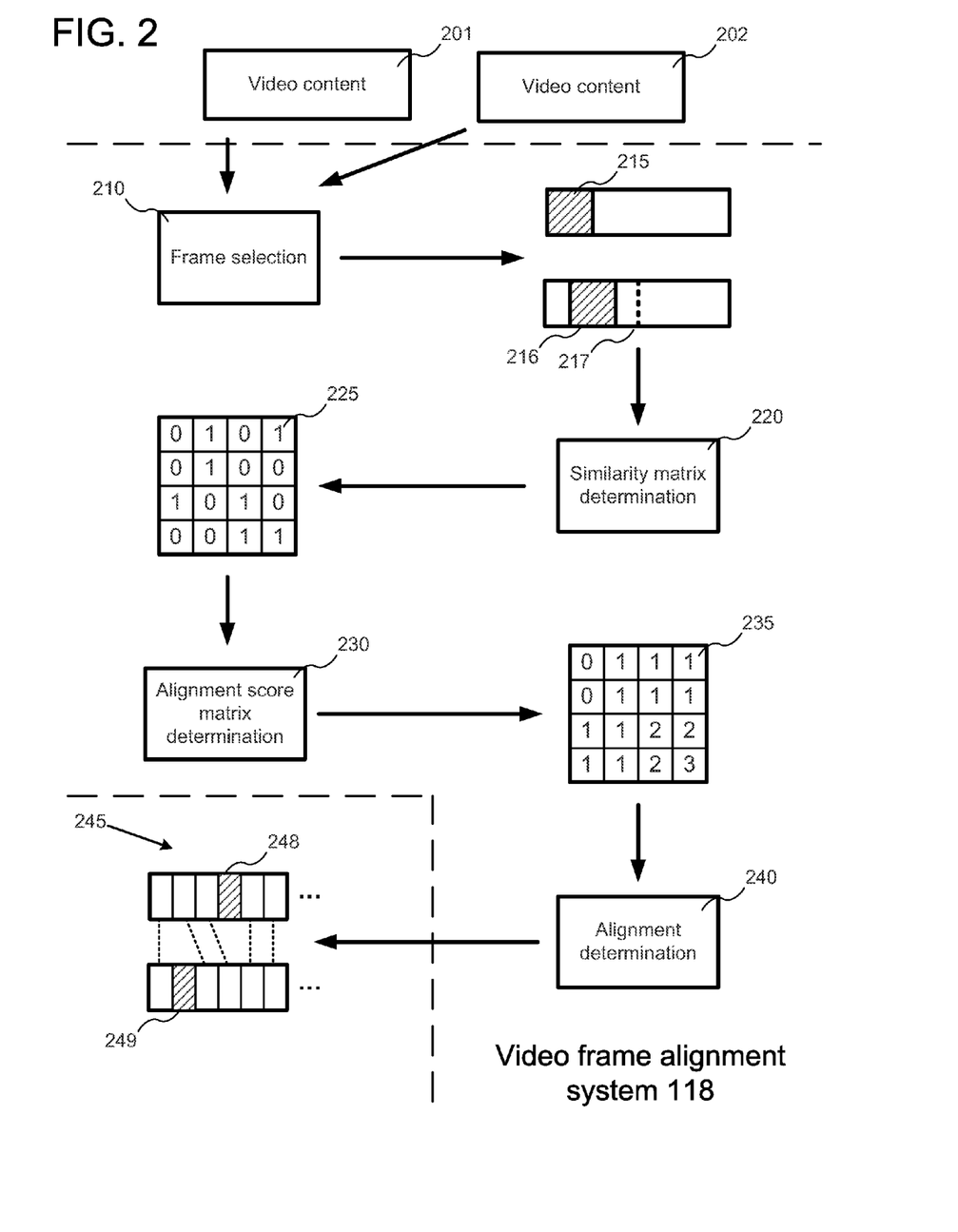
FIG. 2 illustrates an example arrangement of a video frame alignment system in accordance with various embodiments.

Referring now to FIG. 2, an example arrangement of the VFA 118 is shown in accordance with various embodiments. In various embodiments, the VFA 118 may be configured to receive pieces of video content, such as video content 201 and video content 202 and to output an alignment 245 of video frames. In various embodiments, this alignment 245 may include a data structure that maps one or more frames from one of the pieces of video content 201 to one or more frames of the other piece of video content 202, and vice versa. In various embodiments, the VFA 118 may be configured to determine the alignment 245 at least in part through utilization of a Needleman-Wunsch process, such as described below.

In various embodiments, in lieu of being a standalone component as earlier described, the VFA 118 may be included in one or more entities of the content aggregator/distributor server 104, such as the encoder 112, storage 114, and/or content provisioning 116. In various embodiments, the alignment 245 of frames that is output by the VFA 118 may be utilized to determine characteristics of the pieces of video content 201 and 202. In various embodiments, such characteristics may include, but are not limited to: which of the pieces of video content begin first, whether errors are present in one or both of the pieces of video content 201 and 202, and/or whether any frames were dropped or repeated within one of the pieces of video content 201 and 202. Thus, in the example of FIG. 2, while the alignment 245 includes mappings between various frames, this mapping does not include mappings between frames for which there is no mapping to another frame, such as frames 248 and 249. In various embodiments, these unmapped frames may include duplicated frames, or frames for which a corresponding frame in another piece of video content has been dropped. It may be noted that, while the descriptions of the VFA 118 describe determination of alignments between two pieces of video content, in various embodiments, the VFA 118 may be configured to determine alignment for more than two pieces of video content In various embodiments, the VFA 118 may include one or more modules and/or internal data structures which may be utilized to determine the alignment 245. In the example of FIG. 2, these modules and/or internal data structures may be demarcated by the dotted lines. Thus, in various embodiments, the VFA 118 may include a frame selection module 210. This module may be configured to receive the pieces of video content 201 and 202 and to select sets of frames (215 and 216, respectively) from which to generate alignments. In various embodiments, the frames selection module may be configured to select a contiguous set of frames starting at an initial position of a piece of video content, such as the set of frames 215. In other embodiments, the frame selection 210 may be configured to select a contiguous set of frames that is does not begin at an initial position, such as the set of frames 216.

In various embodiments, the frame selection module 210 may be configured to select multiple sets of frames from which to determine an alignment. Thus, in various embodiments, the frame selection module may provide multiple sets of frames to the other modules of the VFA 118, which may thereby generate multiple internal data structures describing multiple potential alignments. These multiple alignments may be compared, such as by the alignment determination module 240, to determine the output alignment 245. In various embodiments, by selecting and comparing multiple sets of frames, and then comparing their outcomes, the VFA 118 may be configured to determine an alignment for the pieces of video content 201 and 202 without requiring that every frame in the two pieces of video content be compared directly. This may provide benefits in time, storage, and computational complexity over a comparison of every frame.

In various embodiments, the frame selection module 210 may be configured to select multiple contiguous sets of contiguous frames such that each set starts one frame (or another pre-determined number of frames) after the previously-determined one. Thus, the frame selection module 210 may be configured to move a frame "window" along a piece of video content to select multiple sets of frames. In various embodiments, the frame selection module 210 may be configured to move the frame window up to a pre-determined limit. Thus, as illustrated, the window may be moved within a larger set of frames 217. In other embodiments, the frame selection module 210 may be configured to select non-contiguous sets of frames.

In various embodiments, the VFA 118 may also include a similarity matrix determination module 220 ("SMD 220"). In various embodiments, the SMD 220 may be configured to receive as input two sets of frames and output a similarity matrix 225 including similarity values comparing the two frames. In various embodiments, the similarity matrix 225 may include values for pairs of frames taken from the two sets of frames selected by the frame selection module 210. Thus, in various embodiments, the similarity matrix 225 may include a row for every frame in a first set of frames and a column for every frame in a second set of frames. The SMD 220 may be configured to include an entry at each cell of the matrix that signifies a quantification of similarity between the two associated frames for that cell.

It may be noted that the illustrated similarity matrix 225 includes only values of 1 and 0. In some embodiments, these values may indicate similarity values that have been normalized to 1 and 0 for the sake of simple illustration. However, in various embodiments, the SMD 220 may include different values in the similarity matrix 225. For example, in some embodiments, the SMD 220 may determine a peak signal-to-noise ratio for a pair of frames and include this value (or a normalized version of the value) as a similarity value in the associated cell. In other embodiments, other processes may be utilized for determining a similarity value, such as a structural similarity index or a difference mean opinion score, as may be understood. In various embodiments, a similarity value may be normalized 1 (or another value) if it falls above a threshold, or to 0 (or another value) when it falls below a threshold. It may be noted that, while a similarity matrix 225 is illustrated, in various embodiments, various data structures may be utilized to record similarity values for processing.

In various embodiments, the VFA 118 may also include an alignment score matrix determination module 230 ("ASMD 230") which may be configured to determine an alignment score matrix 235 of alignment scores. In various embodiments, the ASMD 230 may perform an implementation of a Needleman-Wunsch process for determination of the alignment score matrix 235. Particular examples of this process are described below.

The VFA 118 may also include an alignment determination module 240, which may be configured to determine an alignment 245 for the two pieces of video content 201 and 202. In various embodiments, the alignment determination module 240 may be configured to select an alignment based on multiple alignment score matrices 235 generated after selection of multiple sets of frames by the frame selection module 210. Particular examples of determination of alignments are described below.

Figure 3:
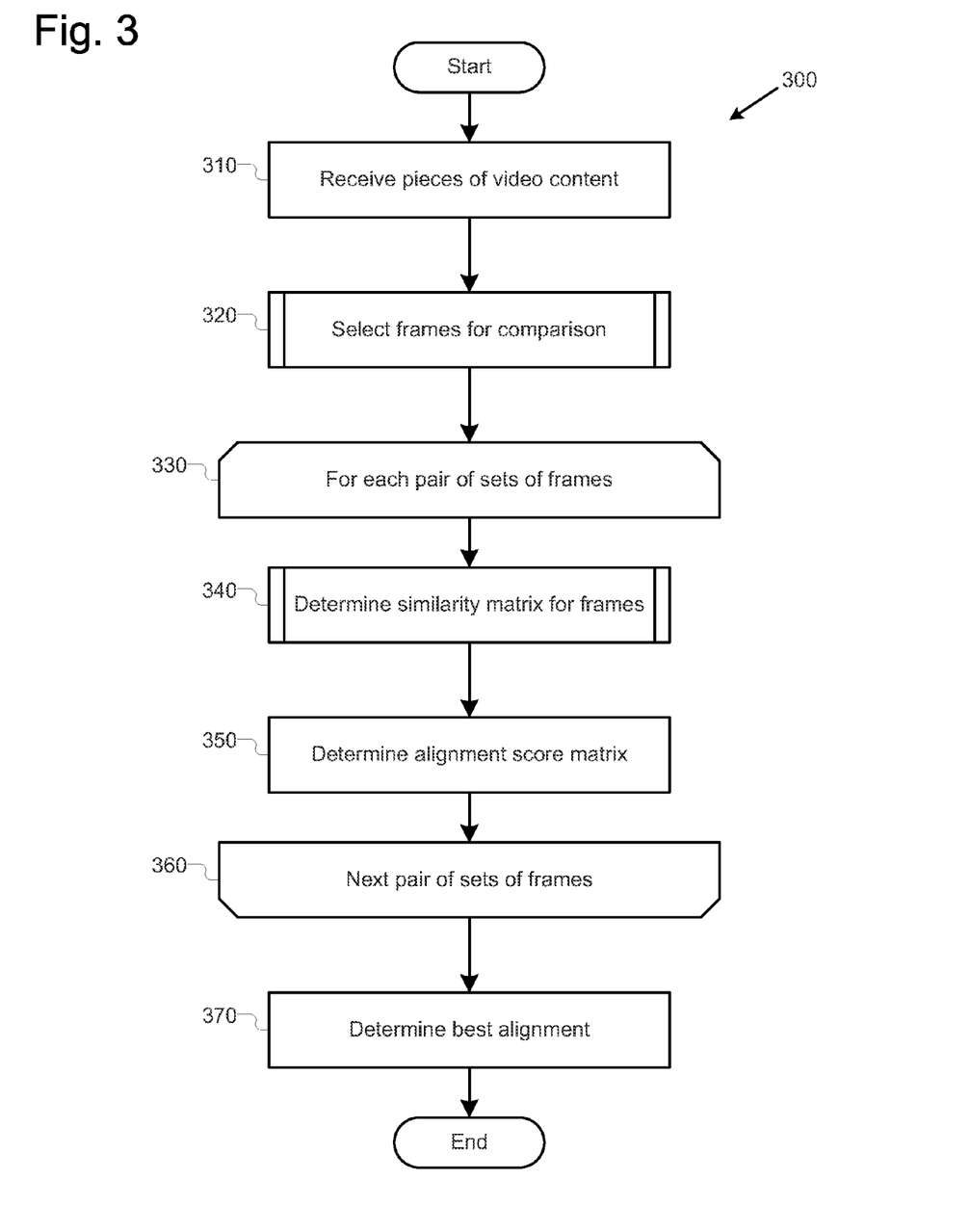
FIG. 3 illustrates an example process for determining an alignment of frames, in accordance with various embodiments.

Referring now to FIG. 3, an example process 300 for determining an alignment of frames is illustrated in accordance with various embodiments. While FIG. 3 illustrates particular example operations for process 300, in various embodiments, process 300 may include additional operations, omit illustrated operations, and/or combine illustrated operations. In various embodiments, process 300 may be performed by the VFA 118. The process may begin at operation 310, wherein the VFA 118 may receive pieces of video content, such as pieces of video content 201 and 202, e.g., by frame selection module 210. In various embodiments, at operation 310 the VFA 118 may also receive information, e.g., by frame selection module 210, about the pieces of video content that may aid in the determination of alignment. For example, in various embodiments, the VFA 118 may receive information that a particular piece of video content is an original piece of video content, while the other piece of video content was generated from the original. In such embodiments, the VFA 118 may utilize a larger gap penalty for gaps in the first piece of video content, since that piece is an original and should not contain gaps.

Next, at operation 320, the VFA 118 may select frames for comparison. In various embodiments, operation 320 may be performed by the frame selection module 210. It may be noted that, while FIG. 3 illustrates operation 320 as occurring one time before further analysis is performed, in various embodiments, the VFA 118 may perform frame selection repeatedly, such as to select particular sets for comparison before those sets of frames are compared.

Figure 4:
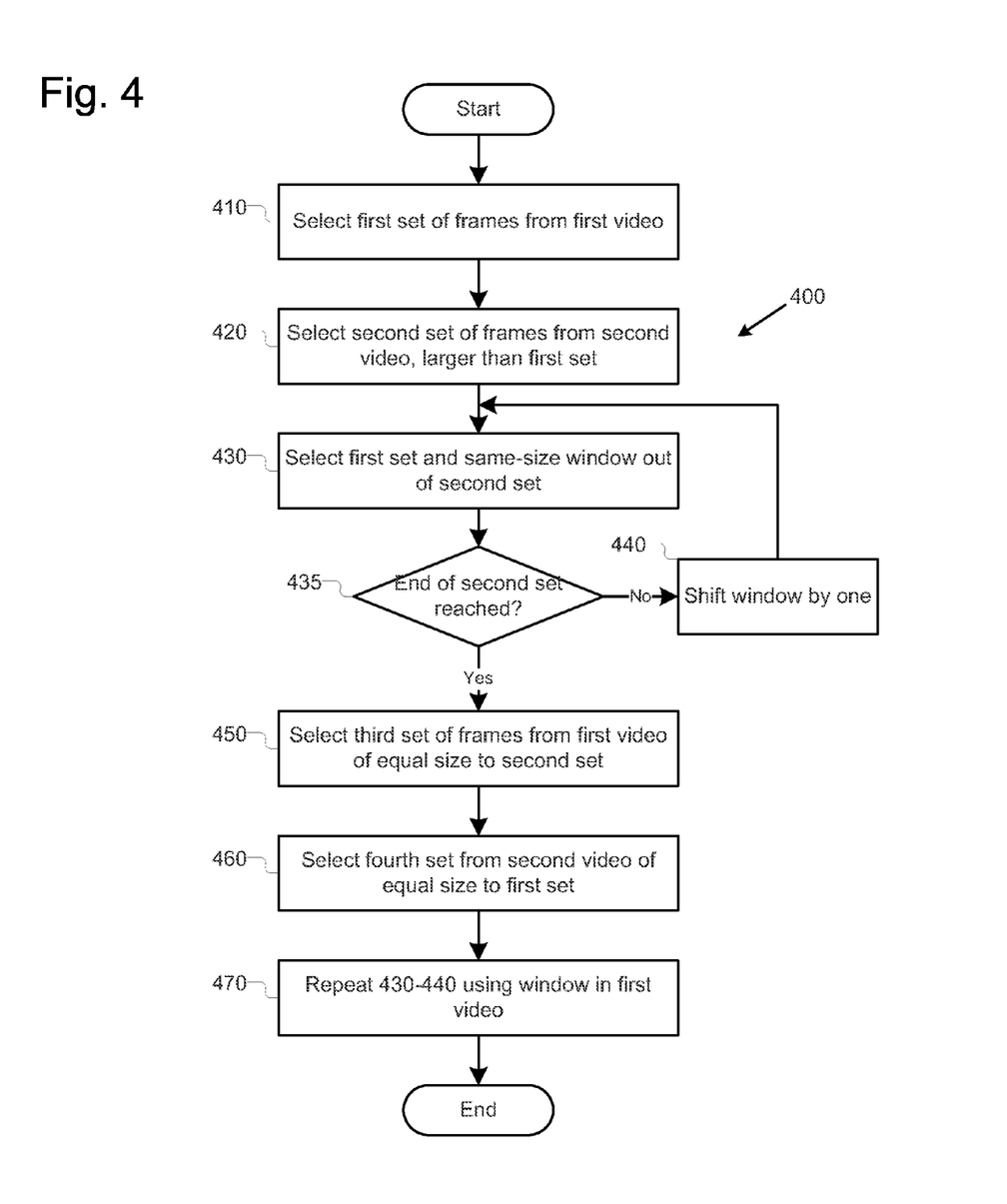
FIG. 4 illustrates an example process for selecting frames for comparison, in accordance with various embodiments.

Referring now to FIG. 4, an example process 400 for selecting frames for comparison is illustrated in accordance with various embodiments. In various embodiments, process 400 may include one or more implementations of operation 320 of process 300. While FIG. 4 illustrates particular example operations for process 400, in various embodiments, process 400 may include additional operations, omit illustrated operations, and/or combine illustrated operations. In various embodiments, process 400 may be performed by the frame selection module 210 of the VFA 118. The process may begin at operation 410, where the frame selection module 210 may select a first set of frames from the first piece of video. In various embodiments, the first set may be selected to contain a predetermined number of frames. Next, at operation 420, the frame selection module 210 may select a second set of frames from the second piece of video. In this operation the frame selection module 210 may select a larger set of frames from the second video than were selected for the first set. In various embodiments, either the first set of frames, the second set of frames, or both may be contiguous sets of frames. In other embodiments, one or both sets of frames may not be contiguous.

Next, at operation 430, the frame selection module 210 may select both the first set of frames as well as a window out of the second set of frames for comparison. In various embodiments, the window may be the same size as the first set of frames. In various embodiments, the first time operation 430 is performed either the first set of frames, the window out of the second set of frames, or both may begin at a first frame of the pieces of video content they are taken from. In other embodiments, one or both sets of frames may not start at the beginning of the pieces of video content. In various embodiments, at the time sets of frames are selected for comparison, the process may return to process 300 to begin comparison of the selected frames. In other embodiments, the selected frames may be recorded by the frame selection module 210 for comparison at a later time, such as when all sets of frames have been selected.

Next, at decision operation 435, the frame selection module 210 may determine whether the window has yet reached the end of the second set of frames. If not, then the window may be shifted over by one frame at operation 440 and the process may be repeated at operation 430. If, however, the window has reached the end of the second set of frames, then the frame selection module may repeat the earlier-performed operations, but with the role of the first and second pieces of video content switched.

Thus, at operation 450, the frame selection module 210 may select a third set of frames from the first piece of video content that is the same size as the second set that had been selected at operation 420. Then, at operation 460, the frame selection module 210 may select at fourth set of frames from the second piece of video content that is the same size as the first set that had been selected at operation 410. Next, at operation 470, operations 430, 435, and 440 may be performed with reference to the newly-selected third and fourth sets of frames. The process may then end.

Returning now to FIG. 3, at operation 330 a loop may begin for each pair of sets of frames selected by the frame selection module 210. At operation 340, the VFA 118 may determine a similarity matrix for the selected frames. In various embodiments, operation 340 may be performed by the SMD 220.

Figure 5:
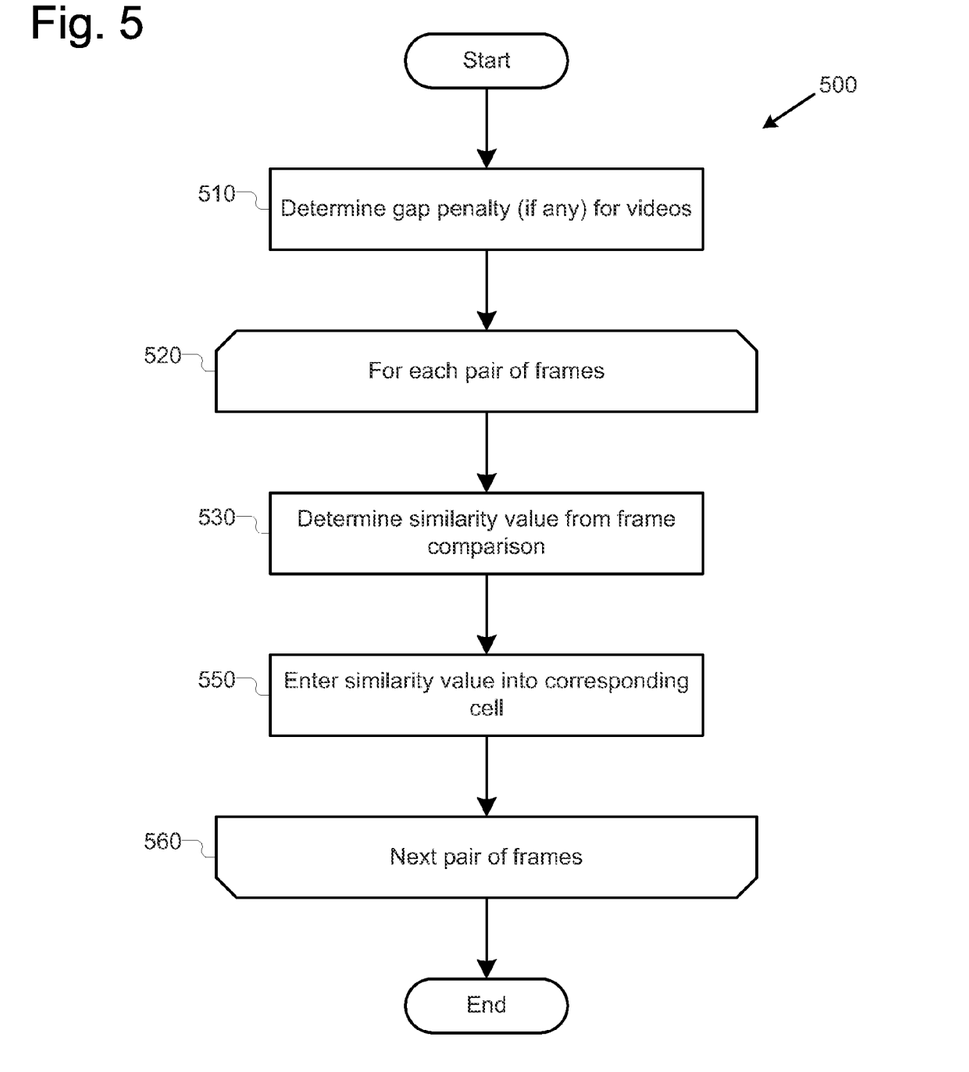
FIG. 5 illustrates an example process for determining a similarity matrix, in accordance with various embodiments.

Referring now to FIG. 5 an example process 500 for determining a similarity matrix is illustrated in accordance with various embodiments. In various embodiments, process 500 may include one or more implementations of operation 330 of process 300. While FIG. 5 illustrates particular example operations for process 500, in various embodiments, process 500 may include additional operations, omit illustrated operations, and/or combine illustrated operations. In various embodiments, process 500 may be performed by the SMD 220 of the VFA 118. The process may begin at operation 510, where the SMD 220 may determine a gap penalty, if any, for the pieces of video content. In various embodiments, this gap penalty may be entered into the similarity value matrix 225 when no match is found between frames. In other embodiments, no gap penalty may be used, and a 0 may be entered when no match is found. In various embodiments, the gap penalty may be used as part of a Needleman-Wunsch process to lessen scores for alignments that have gaps. As discussed above, in various embodiments, the SMD 220 may utilize a different gap penalty for gaps in an original piece of video content than in a copy of video content.

Next, at operation 520, the SMD 220 may begin a loop for each pair of frames. In various embodiments, the loop may be performed on pairs of frames where one frame is taken from the set of frames selected from the first piece of video content and another frame is taken from the set of frames selected from the second piece of video content. At operation 530, the SMD 220 may determine a similarity value by performing a frame comparison. As discussed above, in various embodiments, the frame comparison may include determination of a peak signal-to-noise ratio for the pair of frames. In other embodiments, other processes may be utilized for determining a similarity value, such as a structural similarity index or a difference mean opinion score, as may be understood.

Next, at operation 550, the SMD 220 may enter the determined similarity value into the appropriate cell of the similarity value matrix 225. In various embodiments, rather simply enter the similarity value (e.g. the peak signal-to-noise ratio), a normalized value may be used, and/or other processing may be applied to the similarity value. Next, at operation 560 the loop may continue for the next pair of frames. Once the last pair of frames is reached, the process may then end.

Returning to FIG. 3, at operation 350, the VFA 118 may determine the alignment score matrix 235, such as through operation of the ASMD 230. In various embodiments, the alignment scores in the alignment score matrix 235 may be determined directly from the similarity values in the similarity value matrix 225 using a Needleman-Wunsch process. In various embodiments, the Needleman-Wunsch process may determine a given alignment score for a given cell in the alignment score matrix based on alignment scores that for pairings of earlier frames, as may be understood.

For example, in various embodiments, at operation 350 the alignment score values may be determined recursively, e.g., by ASMD module 210, such as by a process described using the following pseudocode. In the example of the following pseduocode, the cell of the alignment score matrix at the (i, j) position is given by F(i, j) and the gap penalty has a value of d:

```
for i=0 to length(A)
  F(i,0)←d*i
for j=0 to length(B)
  F(0,j)←d*j
for i=1 to length(A)
  for j=1 to length(B)
  {
    Match←F(i−1, j−1)+S(A_i, B_j)
    Delete←F(i−1, j)+d
    Insert←F(i, j−1)+d
    F(i, j)←max (Match, Insert, Delete)
  }
```

As illustrated in the example shown above, the process of operation 340 may first fill in alignment values at the edges of the alignment value matrix based on the gap penalty. It may be noted that if there is no gap penalty, the value of d may be 0, and thus the edges of the alignment value matrix 235 may be 0. After these edges are determined, the process of operation 340 may determine "match," "delete," and "insert" values for a particular pairing based on values for previous frame pairs. Thus, the "match" value may be computed for a frame pair at position (i·j) by adding the similarity value for a current pair to a similarity value for a frame pair at position (i−1, j−1). The "delete" value may be computed for a frame pair at position (i·j) by adding the gap penalty to a similarity value for a frame pair at position (i−1, j). Similarly, the "insert" value may be computed for a frame pair at position (i·j) by adding the gap penalty to a similarity value for a frame pair at position (i, j−1).

While one particular implementation of a Needleman-Wunsch process for determining alignment scores was detailed above, in various embodiments, other implementations of a Needlman-Wunsch process, or another process entirely, may be utilized.

Returning to FIG. 3, at operation 360, the loop may continue for a next pair of sets of frames. If, however, there are no additional sets of frames for comparison, then at operation 370, the VFA 118 may determine a best alignment of frames 245 for output. In various embodiments, the VFA 118 may utilize the alignment determination module 240 to perform operation 370. In various embodiments, the alignment determination module 240 may determine the alignment by selecting an alignment score matrix that contains a greatest alignment score value. In various embodiments, this alignment score value may be located, for a particular alignment score matrix 235, in the bottom right cell of the alignment score matrix 235. In various embodiments, more than one alignment score matrix 235 may contain a highest alignment score value; the alignment determination module 240 may then select from these matrices with the highest alignment score. In various embodiments, the alignment determination module 240 may select an alignment matrix 235 value randomly, may select an alignment score matrix that shows the least amount of deletion for an original piece of video content, or may select an alignment though another technique.

In various embodiments, after the alignment determination module 240 has selected the alignment score matrix 235 with the greatest alignment score value, it may output the alignment 245 of frames that is described by the matrix. In some embodiments, the alignment determination module 240 may simply output the selected alignment score matrix. In other embodiments, an explicit alignment may be determined through application of a Needleman-Wunsch process, as may be understood. For example, the alignment may be determined by identifying a path, starting at the greatest alignment score value at the bottom right of the alignment score matrix, and working backward through successive sub-matrices. For example, in various embodiments, at operation 370 the alignment may be determined recursively, such as by a process described using the following pseudocode. In the example of the following pseduocode, the cell of the alignment score matrix at the (i, j) position is given by F(i, j) and the gap penalty has a value of d, and the length of the sets of frames used to determine the alignment score matrix are given by A and B, respecively:

```
AlignmentA←" "
AlignmentB←" "
i←length(A)
j←length(B)
while (i>0 or j>0)
{
  if (i>0 and j>0 and F(i,j)==F(i−1,j−1)+S(A_i, B_j))
  }
    AlignmentA←A_i+AlignmentA
    AlignmentB←B_j+AlignmentB
    i←i−1
    j←j−1
  }
  else if (i>0 and F(i,j)==F(i−1,j)+d)
  }
    AlignmentA←A_i+AlignmentA
    AlignmentB←"-"+AlignmentB
    i←i−1
  }
  else (j>0 and F(i,j)==F(i,j−1)+d)
  {
    AlignmentA←"-"+AlignmentA
    AlignmentB←B_j+AlignmentB
    j←j−1
  }
}
```

As illustrated in the example given above, the alignment determination module 240 may walk through the alignment score matrix 235 starting at the right-bottom cell and record, for each given alignment score it encounters, whether that alignment score was the result of a match, an insertion, or a deletion. The alignment determination module may then move to the alignment score matrix cell that resulted in the alignment score it just visited, based on how that score was computed (i.e. as a match, insertion, or deletion). The process may be repeated until the alignment determination module 240 has reached the end of a row or column in the alignment score matrix 235.

While one particular implementation of a Needleman-Wunsch process for determining alignment was detailed above, in various embodiments, other implementations of a Needlman-Wunsch process, or another process entirely, may be utilized. After operation 370, process 300 may then end.

Figure 6:
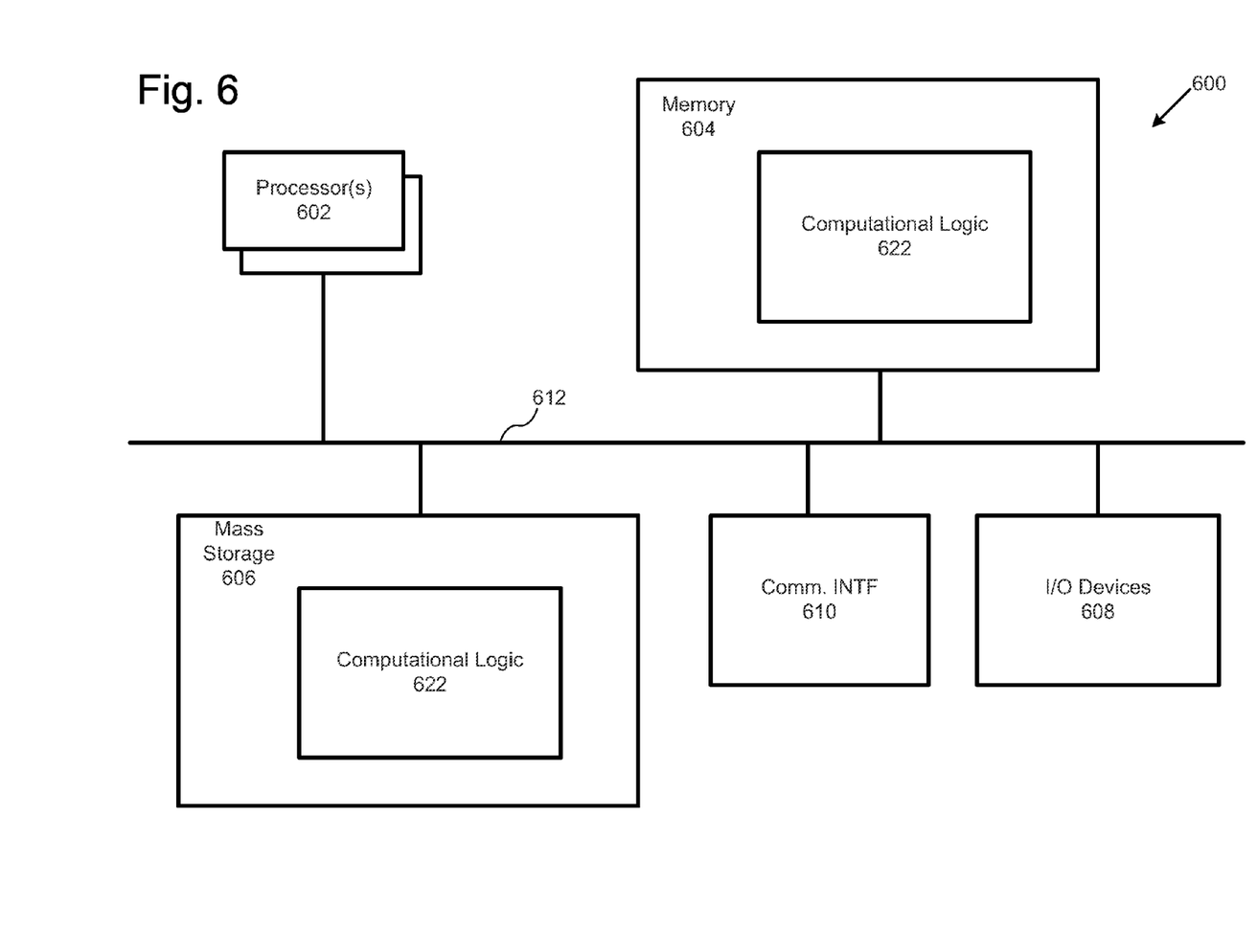
FIG. 6 illustrates an example computing environment suitable for practicing various aspects of the present disclosure, in accordance with various embodiments.

Referring now to FIG. 6, an example computer suitable for practicing various aspects of the present disclosure, including processes of FIGS. 3-5, is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with content aggregator/distributor server 104, e.g., operations associated with video frame alignment module 118 shown in FIGS. 3-5. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on whether computer 600 is used as a content aggregator/distributor server 104 or a content consumption device 108 (e.g., a player 122). Their constitutions are otherwise known, and accordingly will not be further described.

Figure 7:
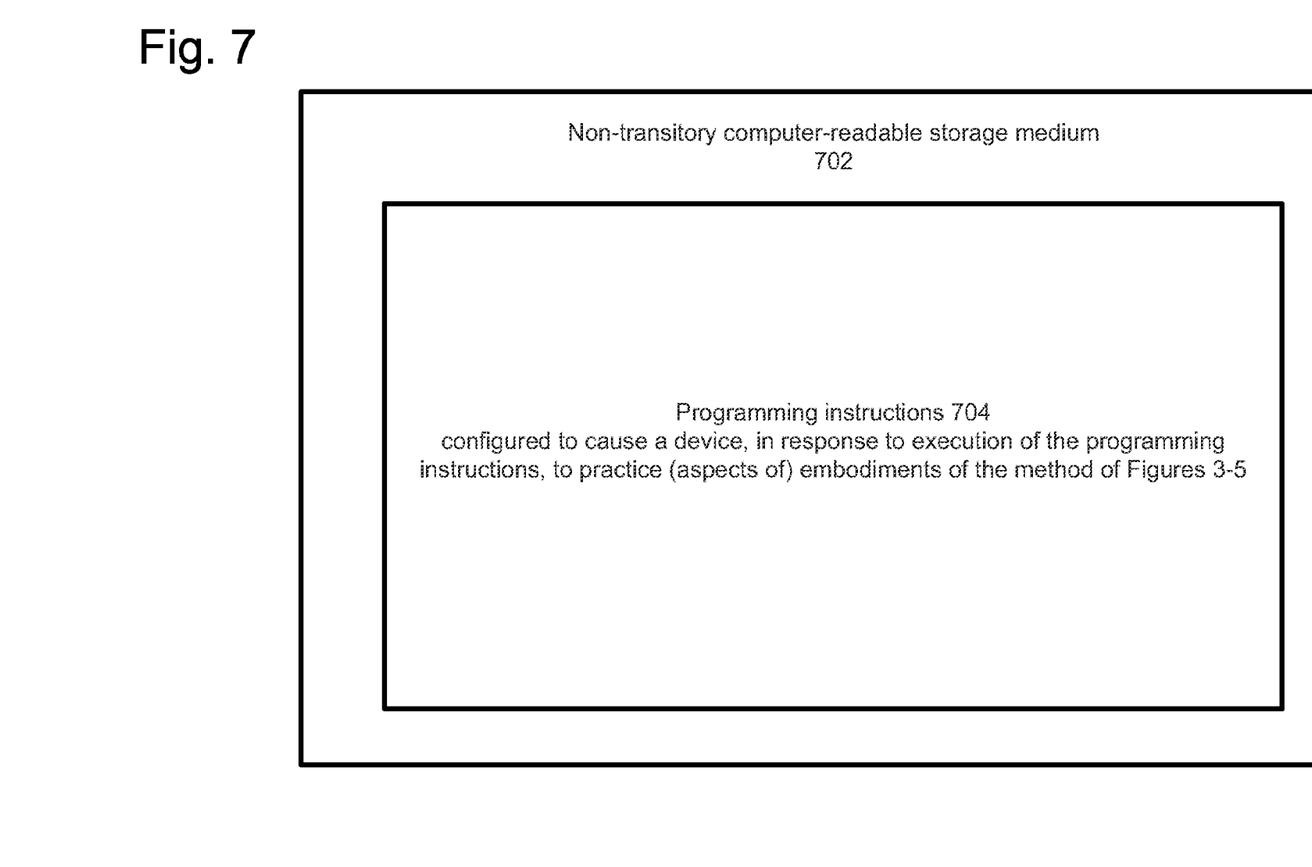
FIG. 7 illustrates an example storage medium with instructions configured to enable an apparatus to practice various aspects of the present disclosure, in accordance with various embodiments.

FIG. 7 illustrates an example least one computer-readable storage medium 702 having instructions configured to practice all or selected ones of the operations associated with content aggregator/distributor servers 104, in particular, video frame alignment module 118, earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes of FIGS. 3-5, e.g., but not limited to, to the various operations performed to perform determination of frame alignments. In alternate embodiments, programming instructions 704 may be disposed on multiple least one computer-readable storage media 702 instead.

Referring back to FIG. 6, for one embodiment, at least one of processors 602 may be packaged together with computational logic 622 configured to practice aspects of processes of FIGS. 3-5. For one embodiment, at least one of processors 602 may be packaged together with computational logic 622 configured to practice aspects of processes of FIGS. 3-5 to form a System in Package (SiP). For one embodiment, at least one of processors 602 may be integrated on the same die with computational logic 622 configured to practice aspects of processes of FIGS. 3-5. For one embodiment, at least one of processors 602 may be packaged together with computational logic 622 configured to practice aspects of processes of FIGS. 3-5 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 may include an apparatus configured to determine an alignment for a first piece of video content and a second piece of video content. The apparatus may include one or more computer processors. The apparatus may also include a similarity matrix determination module configured to operate on the one or more computer processors to determine one or more similarity matrices for one or more pairs of frames from the first and second piece of video content. The apparatus may also include an alignment score matrix determination module configured to operate on the one or more computer processors to determine one or more alignment score matrices based on the similarity matrices. The apparatus may also include an alignment determination module configured to operate on the one or more computer processors to determine an alignment of frames between the first and second pieces of video content based at least in part on the alignment score matrices.

Example 2 may include the apparatus of example 1, and further specify that the apparatus further comprises a frame selection module configured to operate on the one or more computer processors. The frame selection module may be configure to select a first set of frames from the first piece of video content and select a second set of frames from the second piece of video content. Example 2 may further specify that the one or more pairs of frames each comprise a frame from the first set of frames and a frame from the second set of frames.

Example 3 may include the apparatus of example 2, and further specify that the frame selection module is further configured to select the second set of frames out of a third set of frames from the second piece of video content, and further specify that the third set is larger than the second set.

Example 4 may include the apparatus of example 3, and further specify that the frame selection module is further configured to select one or more additional sets of frames from the second piece of video content, the additional sets of frames each being smaller than the third set of frames. Example 4 may further specify that the similarity matrix determination module and alignment score determination module are further configured to repeat the determine the one or more similarity matrices and the determine the one or more alignment score matrices based on one or more pairs of frames comprising frames from the first set of frames and from the additional sets of frames.

Example 5 may include the apparatus of example 4, and further specify that the frame selection module is further configured to: select the second set of frames and each of the additional sets of frames according to a window of a predetermined size; select the first set of frames starting at the first frame of the first piece of video content; select the second set of frames according to the window starting at the first frame of the second piece of video content; and select each of the additional sets of frames according to the window moving one frame at a time through the third set of frames.

Example 6 may include the apparatus of example 2, and further specify that the frame selection module is further configured to select a third set of frames from the second piece of video content and select one or more additional sets of frames from the first piece of video content, each of the one or more sets of frames from the first piece of video content being smaller than the third set of frames. Example 6 may further specify that the similarity matrix determination module and alignment score determination module are further configured to repeat the determine the one or more similarity matrices and the determine the one or more alignment score matrices for each of the one or more sets of frames from the first piece of video content based on one or more pairs of frames comprising frames from the third set of frames and the additional sets of frames from the first piece of video content.

Example 7 may include the apparatus of any of examples 1-6, and further specify that the alignment score matrix determination module is configured to determine one or more alignment scores through application of a Needleman-Wunsch process to each similarity matrix.

Example 8 may include the apparatus media of any of examples 1-6, and further specify that the alignment determination module is configured to determine an alignment through application of a Needleman-Wunsch process to each alignment score matrix.

Example 9 may include the apparatus of any of examples 1-6, and further specify that the similarity matrix determination module is configured to determine the similarity matrix through determination of peak signal-to-noise ratios for each of the one or more pairs of frames.

Example 10 may include the apparatus of any of examples 1-6, and further specify that the similarity matrix determination module is configured to determine the similarity matrix through determination of structural similarity indexes or difference mean opinion scores for each of the one or more pairs of frames.

Example 11 may include one or more computer-readable media containing instructions written thereon that, in response to execution on a computing device, cause the computing device to determine an alignment for a first piece of video content and a second piece of video content. The instructions may cause the computing device to: select a first set of frames from the first piece of video content; select a second set of frames from the second piece of video content; determine one or more alignment score matrices for the pairs of frames; and determine an alignment of frames between the first and second pieces of video content based at least in part on the one or more alignment scores matrices.

Example 12 may include the computer-readable media of example 11, and further specify that the instructions are further configured to cause the computing device to select the second set of frames out of a third set of frames from the second piece of video content, and further specify that the third set is larger than the second set.

Example 13 may include the computer-readable media of example 12, and further specify that the instructions are further configured to cause the computing device to select one or more additional sets of frames from the second piece of video content, the additional sets of frames each being smaller than the third set of frames and to repeat the determine one or more alignment score matrices based on one or more pairs of frames comprising frames from the first set of frames and from the additional sets of frames.

Example 14 may include the computer-readable media of example 13, and further specify that: the second set of frames and each of the additional sets of frames are each selected according to a window of a pre-determined size; the first set of frames is selected starting at the first frame of the first piece of video content; the second set of frames is selected according to the window starting at the first frame of the second piece of video content; and that each of the additional sets of frames are selected according to the window moving one frame at a time through the third set of frames.

Example 15 may include the computer-readable media of example 11, and further specify that the instructions are further configured to cause the computing device to: select a third set of frames from the second piece of video content; select one or more additional sets of frames from the first piece of video content, each of the one or more sets of frames from the first piece of video content being smaller than the third set of frames; and repeat the determine one or more alignment score matrices based on one or more pairs of frames comprising frames from the third set of frames and the additional sets of frames from the first piece of video content.

Example 16 may include the computer-readable media of any of examples 11-15, and further specify that the instructions are further configured to cause the computing device to determine one or more similarity matrices for each of one or more pairs of frames of the first and second sets of frames and further specify that determination of the one or more alignment score matrices are based at least in part on the one or more similarity matrices.

Example 17 may include the computer-readable media of example 16, and further specify that determine one or more alignment score matrices comprises apply a Needleman-Wunsch process to each similarity matrix.

Example 18 may include the computer-readable media of any of examples 11-15, and further specify that determine an alignment comprises apply a Needleman-Wunsch process to each alignment score matrix.

Example 19 may include the computer-readable media of example 16, and further specify that determine one or more similarity matrices for each of one or more pairs of frames comprises determine a peak signal-to-noise ratio for each of the one or more pairs of frames.

Example 20 may include the computer-readable media of example 16, and further specify that determine one or more similarity matrices for each of one or more pairs of frames comprises determine a structural similarity index or a difference mean opinion score for each of the one or more pairs of frames.

Example 21 may include a computer-implemented method for determining an alignment for a first piece of video content and a second piece of video content. The method may include: selecting, by a computing device, a first set of frames from the first piece of video content; selecting, by the computing device, a second set of frames from the second piece of video content; determining, by the computing device, one or more alignment score matrices for the pairs of frames; and determining, by the computing device, an alignment of frames between the first and second pieces of video content based at least in part on the alignment score matrices.

Example 22 may include the method of example 21, and further include selecting, by the computing device, the second set of frames out of a third set of frames from the second piece of video content, and further specify that the third set is larger than the second set.

Example 23 may include the method of example 22, further including selecting, by the computing device, one or more additional sets of frames from the second piece of video content, the additional sets of frames each being smaller than the third set of frames and repeating, by the computing device, the determining the one or more alignment score matrices based on one or more pairs of frames comprising frames from the first set of frames and from the additional sets of frames.

Example 24 may include the method of example 23, and further specify that: selecting the second set of frames and each of the additional sets of frames comprises selecting sets of frames according to a window of a pre-determined size; selecting the first set of frames comprises selecting starting at the first frame of the first piece of video content; selecting the second set of frames further comprises selecting according to the window starting at the first frame of the second piece of video content; and selecting each of the additional sets of frames further comprises selecting according to the window moving one frame at a time through the third set of frames.

Example 25 may include the method of example 21, and further include: selecting, by the computing device, a third set of frames from the second piece of video content; selecting, by the computing device, one or more additional sets of frames from the first piece of video content, each of the one or more sets of frames from the first piece of video content being smaller than the third set of frames; and repeating, by the computing device, the determining one or more alignment score matrices based on one or more pairs of frames comprising frames from the third set of frames and the additional sets of frames from the first piece of video content.

Example 26 may include the method of any of examples 21-25, further including determining, by the computing device, one or more similarity matrices for each of one or more pairs of frames of the first and second sets of frames and may further specify that determining one or more alignment score matrices is based at least in part on the one or more similarity matrices.

Example 27 may include the method of example 26, and further specify that determining one or more alignment score matrices comprises applying a Needleman-Wunsch process to each similarity matrix.

Example 28 may include the method of any of examples 21-25, and further specify that determining the one or more alignment score matrices comprises applying a Needleman-Wunsch process to each alignment score matrix.

Example 29 may include the method of examples 26, and further specify that determining one or more similarity matrices comprises determining peak signal-to-noise ratios for each of the one or more pairs of frames.

Example 30 may include the method of example 26, and further specify that determining the one or more similarity matrices comprises determining structural similarity indexes or difference mean opinion scores for each of the one or more pairs of frames.

Example 31 may include an apparatus for determining an alignment for a first piece of video content and a second piece of video content. The apparatus may include: means for determining one or more similarity matrices for one or more pairs of frames from the first and second piece of video content; means for determining one or more alignment score matrices based on the similarity matrices; and means for determining an alignment of frames between the first and second pieces of video content based at least in part on the alignment score matrices.

Example 32 may include the apparatus of example 31, and further include: means for selecting a first set of frames from the first piece of video content and means for selecting a second set of frames from the second piece of video content. Example 32 may further specify that the one or more pairs of frames each comprise a frame from the first set of frames and a frame from the second set of frames.

Example 33 may include the apparatus of example 32, further including means for selecting the second set of frames out of a third set of frames from the second piece of video content, and further specify that the third set is larger than the second set.

Example 34 may include the apparatus of example 33, further including: means for selecting one or more additional sets of frames from the second piece of video content, the additional sets of frames each being smaller than the third set of frames; and means for repeating the determining the one or more similarity matrices and the determining the one or more alignment score matrices based on one or more pairs of frames comprising frames from the first set of frames and from the additional sets of frames.

Example 35 may include the apparatus of example 34, and further specify that: means for selecting the second set of frames and each of the additional sets of frames comprises means for selecting sets of frames according to a window of a pre-determined size; means for selecting the first set of frames comprises means for selecting starting at the first frame of the first piece of video content; means for selecting the second set of frames further comprises means for selecting according to the window starting at the first frame of the second piece of video content; and means for selecting each of the additional sets of frames further comprises means for selecting according to the window moving one frame at a time through the third set of frames.

Example 36 may include the apparatus of example 32, further including: means for selecting a third set of frames from the second piece of video content; means for selecting, one or more additional sets of frames from the first piece of video content, each of the one or more sets of frames from the first piece of video content being smaller than the third set of frames; and means for repeating the determining the one or more similarity matrices and the determining the one or more alignment score matrices for each of the one or more sets of frames from the first piece of video content based on one or more pairs of frames comprising frames from the third set of frames and the additional sets of frames from the first piece of video content.

Example 37 may include the apparatus of any one of examples 31-36, and further specify that means for determining one or more alignment score matrices comprises means for applying a Needleman-Wunsch process to each similarity matrix.

Example 38 may include the apparatus of any one of examples 31-36, and further specify that means for determining the one or more alignment score matrices comprises means for applying a Needleman-Wunsch process to each alignment score matrix.

Example 39 may include the apparatus of any one of examples 31-36, and further specify that means for determining the one or more similarity matrices comprises means for determining peak signal-to-noise ratios for each of the one or more pairs of frames.

Example 40 may include the apparatus of any one of examples 31-36, and further specify that means for determining the one or more similarity matrices comprises means for determining structural similarity indexes or difference mean opinion scores for each of the one or more pairs of frames.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or

What is claimed is:

1. One or more non-transitory computer-readable storage media comprising a plurality of instructions configured to cause a computing device, in response to execution of the instructions by the computing device, to:

select a first set of frames from a first piece of video content, wherein the first set of frames is selected starting at a first frame of the first piece of video content;

select a second set of frames, out of a third set of frames, from a second piece of video content, wherein the third set of frames is larger than the second set of frames;

determine one or more alignment score matrices for one or more pairs of frames of the first and second sets of frames from the first and second pieces of video content;

determine an alignment of frames between the first and second pieces of video content based at least in part on the one or more alignment scores matrices;

select one or more additional sets of frames from the second piece of video content; and repeat the determining one or more alignment score matrices based on one or more pairs of frames comprising frames from the first set of frames and frames from the additional sets of frames, wherein:

the second set of frames and each of the additional sets of frames are each selected according to a window of a predetermined size, the second set of frames is selected according to the window starting at a first frame of the second piece of video content, and each of the additional sets of frames are selected according to the window starting at a frame in the third set of frames.

2. The computer-readable storage media of claim 1, wherein the instructions are further configured to cause the computing device to determine one or more similarity matrices for the one or more pairs of frames of the first and second sets of frames and wherein determination of the one or more alignment score matrices are based at least in part on the one or more similarity matrices.

3. The computer-readable storage media of claim 2, wherein the instructions are further configured to cause the computing device to:

select the third set of frames from the second piece of video content;

select one or more additional sets of frames from the first piece of video content, each of the one or more sets of frames from the first piece of video content being smaller than the third set of frames; and repeat the determining one or more similarity matrices and determine one or more alignment score matrices based on one or more pairs of frames comprising frames from the third set of frames and the additional sets of frames from the first piece of video content.

4. The computer-readable storage media of claim 2, wherein the determining one or more alignment score matrices comprises applying a Needleman-Wunsch process to each similarity matrix.

5. The computer-readable storage media of claim 1, wherein the determining an alignment comprises applying a Needleman-Wunsch process to each alignment score matrix.

6. The computer-readable storage media of claim 2, wherein the determining one or more similarity matrices comprises determining a peak signal-to-noise ratio for each of the one or more pairs of frames.

7. The computer-readable storage media of claim 2, wherein the determining one or more similarity matrices comprises determining a structural similarity index or a difference mean opinion score for each of the one or more pairs of frames.

8. An apparatus comprising:
one or more computer processors configured to:

select a first set of frames from a first piece of video content, wherein the first set of frames is selected starting at a first frame of the first piece of video content;

select a second set of frames, out of a third set of frames, from the second piece of video content;

determine one or more similarity matrices for one or more pairs of frames from the first and the second pieces of video content;

determine one or more alignment score matrices based on the similarity matrices;

determine an alignment of frames between the first and second pieces of video content based at least in part on the alignment scores matrices;

select one or more additional sets of frames from the second piece of video content; and repeat the determining one or more alignment score matrices based on one or more pairs of frames comprising frames from the first set of frames and frames from the additional sets of frames, wherein:

the second set of frames and each of the additional sets of frames are each selected according to a window of a predetermined size, the second set of frames is selected according to the window starting at a first frame of the second piece of video content, and each of the additional sets of frames are selected according to the window starting at a frame in the third set of frames.

9. The apparatus of claim 8, wherein the one or more computer processors are further configured to:

repeat the determining the one or more similarity matrices based on one or more pairs of frames comprising frames from the first set of frames and frames from the additional sets of frames.

10. The apparatus of claim 8, wherein the one or more computer processors are further configured to:

determine one or more alignment scores through application of a Needleman-Wunsch process to each similarity matrix; and determine an alignment through application of a Needleman-Wunsch process to each alignment score matrix.

11. The apparatus of claim 8, wherein the one or more computer processors are further configured to determine the similarity matrix through determination of peak signal-to-noise ratios for each of the one or more pairs of frames.

12. A computer-implemented method comprising:

select a first set of frames from a first piece of video content, wherein the first set of frames is selected starting at a first frame of the first piece of video content;

select a second set of frames, out of a third set of frames, from a second piece of video content;

determining, by a computing device, one or more alignment score matrices for one or more pairs of frames of the first and second set of frames from the first and second pieces of video content;

determining, by the computing device an alignment of frames between the first and second pieces of video content based at least in part on the alignment score matrices;

selecting, by the computing device, one or more additional sets of frames from the second piece of video content; and repeating the determining one or more alignment score matrices based on one or more pairs of frames comprising frames from the first set of frames and frames from the additional sets of frames, wherein:

the second set of frames and each of the additional sets of frames are each selected according to a window of a predetermined size, the second set of frames is selected according to the window starting at a first frame of the second piece of video content, and each of the additional sets of frames are selected according to the window starting at a frame in the third set of frames.

13. The method of claim 12, further comprising:

determining, by the computing device, one or more similarity matrices for the one or more pairs of frames of the first and second sets of frames and wherein determination of the one or more alignment score matrices is based at least in part on the one or more similarity matrices.

14. The method of claim 13, further comprising:

repeating, by the computing device, the determining the one or more similarity matrices based on one or more pairs of frames comprising frames from the first set of frames and frames from the additional sets of frames.

15. The method of claim 12, wherein:

determining one or more alignment score matrices comprises applying a Needleman-Wunsch process to each similarity matrix; and determining the alignment comprises applying a Needleman-Wunsch process to each alignment score matrix.

16. The method of claim 13, wherein determining the one or more similarity matrices comprises determining peak signal-to-noise ratios for each of the one or more pairs of frames.

17. An apparatus comprising:

means for selecting a first set of frames from a first piece of video content;

means for selecting a second set of frames, out of a third set of frame, from a second piece of video content;

means for determining a similarity matrix for each of one or more pairs of frames from the first and the second pieces of video content;

means for determining one or more alignment score matrices for the pairs of frames based on the determined similarity matrices;

means for determining an alignment of frames between the first and second pieces of video content based at least in part on the alignment score matrices;

means for selecting one or more additional sets of frames from the second piece of video content; and means for repeating the determining one or more alignment score matrices based on one or more pairs of frames comprising frames from the first set of frames and frames from the additional sets of frames, wherein:

the second set of frames and each of the additional sets of frames are each selected according to a window of a predetermined size, the second set of frames is selected according to the window starting at a first frame of the second piece of video content, and each of the additional sets of frames are selected according to the window starting at a frame in the third set of frames.

18. The apparatus of claim 17, wherein:

the one or more pairs of frames each comprise a frame from the first set of frames and a frame from the second set of frames.

19. The apparatus of claim 18, further comprising:

means for repeating the determining the one or more similarity matrices based on one or more pairs of frames comprising frames from the first set of frames and frames from the additional sets of frames.

20. The apparatus of claim 17, wherein:

the means for determining one or more alignment score matrices comprises means for applying a Needleman-Wunsch process to each similarity matrix; and the means for determining the alignment comprises means for applying a Needleman-Wunsch process to each alignment score matrix.

21. The apparatus of claim 17, wherein the means for determining the similarity matrix comprises means for determining peak signal-to-noise ratios for each of the one or more pairs of frames.

* * * * *